(12) United States Patent
Scholte-Wassink et al.

(10) Patent No.: US 10,415,544 B2
(45) Date of Patent: Sep. 17, 2019

(54) SYSTEM AND METHOD FOR DETERMINING TORQUE ON A WIND TURBINE SHAFT

(71) Applicant: General Electric Company, Schenectady, NY (US)

(72) Inventors: Hartmut Scholte-Wassink, Lage (DE); Till Hoffmann, Osnabrueck (DE)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 15/397,041

(22) Filed: Jan. 3, 2017

(65) Prior Publication Data

US 2018/0187655 A1 Jul. 5, 2018

(51) Int. Cl.
*F03D 17/00* (2016.01)
*F03D 7/02* (2006.01)
(Continued)

(52) U.S. Cl.
CPC ............ *F03D 7/0296* (2013.01); *F03D 7/00* (2013.01); *F03D 7/0272* (2013.01); *F03D 17/00* (2016.05); *F03D 13/20* (2016.05); *F03D 15/00* (2016.05); *F05B 2260/40311* (2013.01); *F05B 2260/96* (2013.01); *F05B 2260/964* (2013.01); *F05B 2270/1032* (2013.01); *F05B 2270/30* (2013.01); *F05B 2270/335* (2013.01); *Y02E 10/721* (2013.01); *Y02E 10/723* (2013.01)

(58) Field of Classification Search
CPC ............ F05B 2260/96; F05B 2260/964; F05B 2270/335; F05B 2270/1032; F05B 2270/30; Y02E 10/723; F03D 7/00; F03D 7/0272; F03D 7/0296; F03D 17/00
See application file for complete search history.

(56) References Cited

U.S. PATENT DOCUMENTS 8,210,507 B2 7/2012 Mitsch
8,860,382 B2 * 10/2014 Freier .................... G05D 19/00
322/36
(Continued)

FOREIGN PATENT DOCUMENTS

EP 2 053 241 A1 4/2009
EP 2 434 154 A1 3/2012

OTHER PUBLICATIONS

Extended European Search Report and Opinion issued in connection with corresponding EP Application No. 17209776.8 dated May 30, 2018.

*Primary Examiner* — Peter J Bertheaud
(74) *Attorney, Agent, or Firm* — Dority & Manning, P.A.

(57) ABSTRACT

The present disclosure is directed to a system for determining a torque exerted on a shaft of a wind turbine. The system includes a gearbox coupled to the shaft. The gearbox includes a first arm and a second arm. First and second fluid dampers respectively couple to the first and second arms of the gearbox. A first fluid conduit fluidly couples the first and second fluid dampers. A first pressure sensor is in operative association with the first fluid conduit to detect a fluid pressure of fluid within the first fluid conduit. A controller communicatively couples to the first pressure sensor. The controller is configured to determine the torque exerted on the shaft based on signals received from the first pressure sensor.

20 Claims, 5 Drawing Sheets

(51) Int. Cl.
  *F03D 7/00*   (2006.01)
  *F03D 13/20*  (2016.01)
  *F03D 15/00*  (2016.01)

(56) References Cited

U.S. PATENT DOCUMENTS

| | | | | |
|---|---|---|---|---|
| 8,881,583 | B2* | 11/2014 | Sakaguchi | F03D 7/0244 |
| | | | | 73/112.01 |
| 9,835,135 | B2* | 12/2017 | Draper | F03D 7/028 |
| 9,906,091 | B2* | 2/2018 | Jensen | F03D 80/88 |
| 10,006,441 | B2* | 6/2018 | Schindele | F03D 7/0296 |
| 10,197,075 | B2* | 2/2019 | Brokes | F15B 15/02 |
| 2012/0025526 | A1* | 2/2012 | Luo | H02P 9/04 |
| | | | | 290/44 |
| 2015/0361956 | A1 | 12/2015 | Stehlin et al. | |
| 2016/0298603 | A1* | 10/2016 | Guem | F03D 15/00 |
| 2016/0298604 | A1* | 10/2016 | Guem | F03D 15/00 |

* cited by examiner

SYSTEM AND METHOD FOR DETERMINING TORQUE ON A WIND TURBINE SHAFT

FIELD

The present disclosure generally relates to wind turbines. More particularly, the present disclosure relates to systems and methods for determining torque exerted on shafts of wind turbines.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

The drivetrain may include a gearbox, a rotor shaft, and a generator shaft. More specifically, the rotor shaft may rotatably couple the rotor blades to the gearbox. The generator shaft may rotatably couple the gearbox to the generator. In this respect, the drivetrain and, in particular, the gearbox may allow the generator to rotate at a different speed than the rotor blades.

During operation of the wind turbine, the rotor blades exert torque on the rotor shaft. The magnitude of the torque exerted on the rotor shaft may be useful in determining various operating and performance characteristics of the wind turbine. For example, the torque exerted on the rotor shaft may be used when determining the wind speed, the load on a drivetrain of the wind turbine, the electrical power generated by the wind turbine, and/or the power losses occurring in the wind turbine.

Conventional systems and methods for determining the torque exerted on the rotor shaft may provide unreliable torque determinations. For example, some conventional systems and methods determine the torque exerted on the rotor shaft based on measurements taken from the generator. These systems and method do not account for losses in the gearbox and are prone to error. Systems and methods that use strain gauges placed on the rotor shaft to determine the torque exerted thereon are also inaccurate. Furthermore, determining the torque on the rotor shaft based off of electrical characteristics of the wind turbine (e.g., measured electrical power) is also unreliable.

Accordingly, improved wind turbines, and, in particular, improved systems and methods for determining the torque exerted on wind turbine shafts, are desired in the art. Specifically, systems and methods that produce relatively more reliable torque determinations would be advantageous.

BRIEF DESCRIPTION

Aspects and advantages of the technology will be set forth in part in the following description, or may be obvious from the description, or may be learned through practice of the technology.

In one embodiment, the present disclosure is directed to a system for determining a torque exerted on a shaft of a wind turbine. The system includes a gearbox coupled to the shaft. The gearbox includes a first arm and a second arm. First and second fluid dampers respectively couple to the first and second arms of the gearbox. A first fluid conduit fluidly couples the first and second fluid dampers. A first pressure sensor is in operative association with the first fluid conduit to detect a fluid pressure of fluid within the first fluid conduit. A controller communicatively couples to the first pressure sensor. The controller is configured to determine the torque exerted on the shaft based on signals received from the first pressure sensor.

In another embodiment, the present disclosure is directed to a wind turbine. The wind turbine includes a tower, a nacelle mounted on the tower, and a rotor coupled to the nacelle. The rotor includes a hub and at least one rotor blade extending from the hub. A gearbox is positioned within the nacelle and includes first and second arms. A gearbox mount couples the gearbox to the nacelle. A shaft rotatably couples the rotor and the gearbox. First and second fluid dampers respectively couple the first and second arms of the gearbox to a gearbox mount. A first fluid conduit fluidly couples the first and second fluid dampers. A first pressure sensor is in operative association with the first fluid conduit to detect a fluid pressure of a fluid within the first fluid conduit. A controller communicatively couples to the first pressure sensor. The controller is configured to determine the torque exerted on the shaft based on signals received from the first pressure sensor.

In a further embodiment, the present disclosure is directed to a method for determining a torque exerted on a shaft of a wind turbine. The method includes measuring, with a first pressure sensor, an operating fluid pressure of fluid in a first fluid conduit fluidly coupling first and second fluid dampers that support a gearbox relative to a gearbox mount. The method also includes receiving, with a controller, a signal from the first pressure sensor. The signal is associated with the operating fluid pressure within the first fluid conduit. The method further includes determining, with the controller, the torque exerted on the shaft based on the operating fluid pressure within the first fluid conduit.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which.

Figure 1:
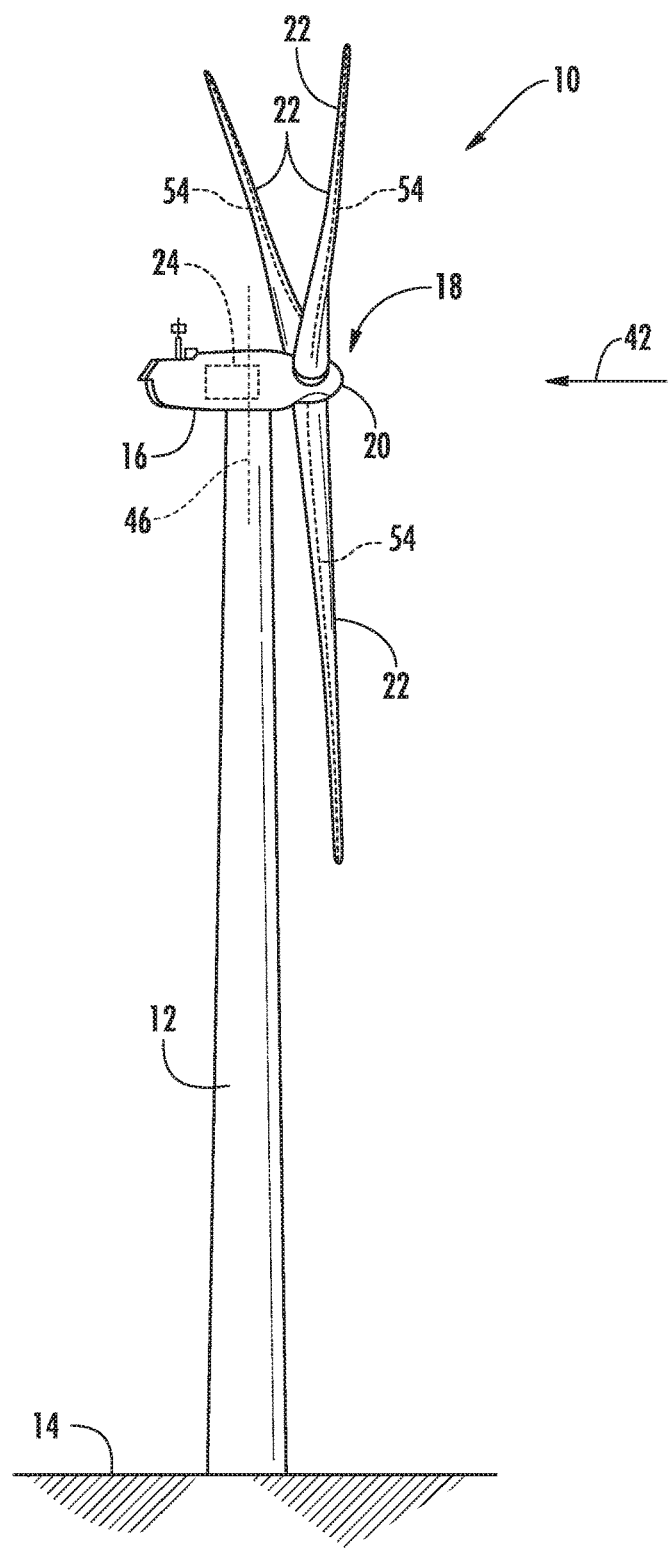
FIG. 1 is a perspective view of a wind turbine in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable rotational, mechanical energy. A generator 24 positioned in the nacelle 16 may generate electrical power from the rotational energy of the rotor 18.

Figure 2:
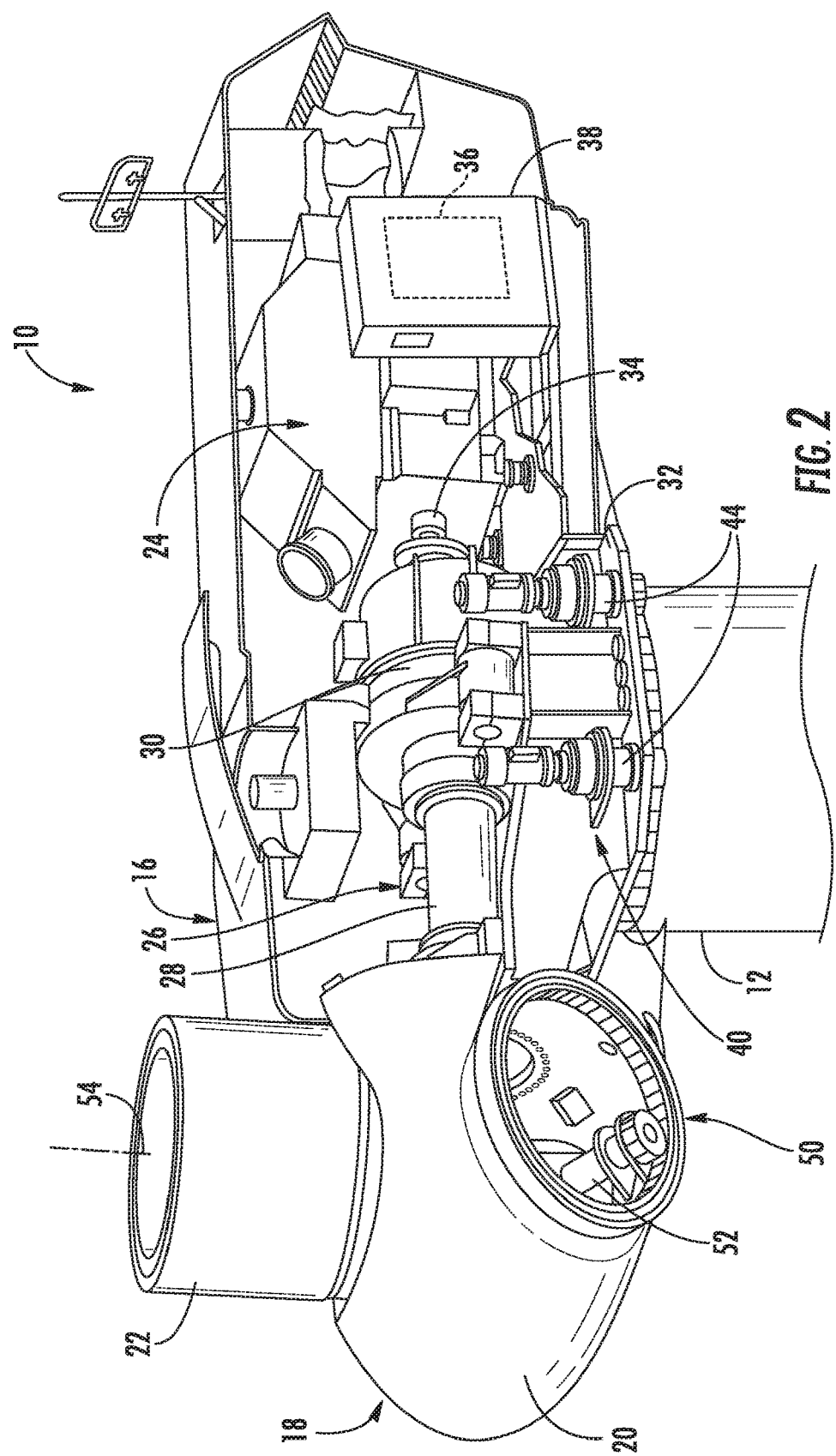
FIG. 2 is a perspective, internal view of a nacelle of a wind turbine in accordance with embodiments of the present disclosure.

Referring now to FIG. 2, a drivetrain 26 rotatably couples the rotor 18 to the electric generator 24. As shown, the drivetrain 26 may include a rotor shaft 28 that rotatably couples the hub 20 of the rotor 18 to a gearbox assembly 30. The gearbox assembly 30 may be supported by and coupled to a bedplate 32 in the nacelle 16. The drivetrain 26 may also include a generator shaft 34 that rotatably couples the gearbox assembly 30 to the generator 24. In this respect, rotation of the rotor 18 drives the generator 24. More specifically, the rotor shaft 28 may provide a low speed, high torque input to the gearbox assembly 30 in response to rotation of the rotor blades 22 and the hub 20. The gearbox assembly 30 may then convert the low speed, high torque input to a high speed, low torque output to drive the generator shaft 34 and, thus, the generator 24. In alternate embodiments, however, the generator 24 may be directly rotatably coupled to the rotor shaft 28 in a direct-drive configuration.

The wind turbine 10 may also include a turbine control system or a turbine controller 36. In the embodiment shown in FIG. 2, for example, the turbine controller 36 is disposed within a control cabinet 38 mounted to a portion of the nacelle 16. In alternate embodiments, however, the turbine controller 36 may be disposed at any location on or in the wind turbine 10, at any location on the support surface 14, or any other suitable location.

The turbine controller 36 may be communicatively coupled to various components of the wind turbine 10 for generally controlling the wind turbine 10 and/or such components. In certain embodiments, the turbine controller 36 may be communicatively coupled to the yaw drive mechanism 40 for controlling a yaw direction of the nacelle 16 relative to a wind direction 42 (FIG. 1). For example, the turbine controller 36 may be configured to transmit a control signal to the the yaw drive mechanism 40 such that an electric motor or other suitable actuator 44 of the yaw drive mechanism 40 rotates the nacelle 16 about a yaw axis 46 (FIG. 1). Furthermore, the turbine controller 36 may also be communicatively coupled to one or more pitch adjustment mechanisms 48 (one of which is shown in FIG. 2) for controlling a pitch angle of the rotor blades 22 relative to the wind direction 42. For example, the turbine controller 36 may be configured to transmit a control signal to each pitch adjustment mechanism 48 such that an electric motor or other suitable actuator 52 of each pitch adjustment mechanism 48 rotates each blade 22 about a corresponding pitch axis 54 (FIG. 1) relative to the hub 20.

Figure 3:
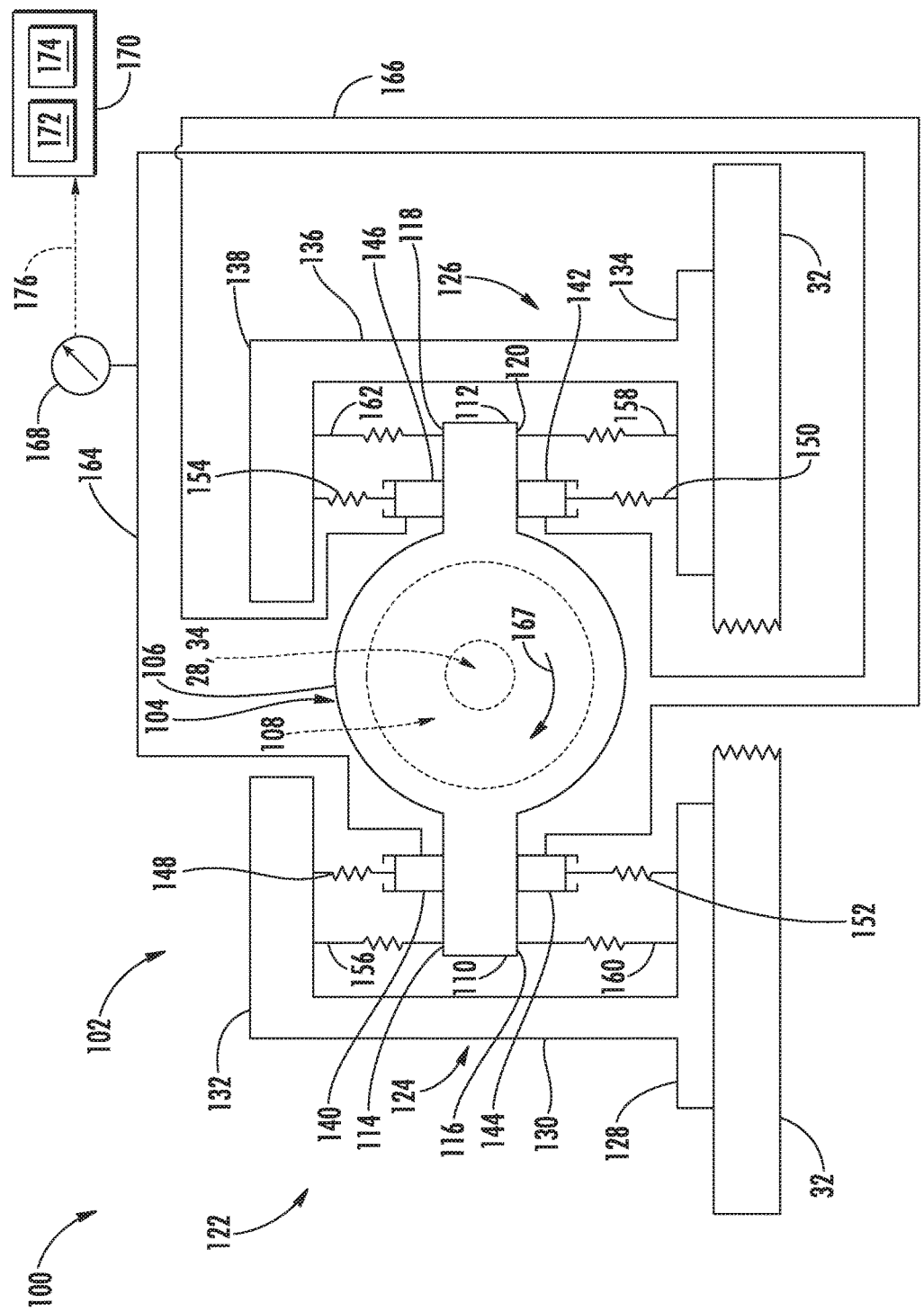
FIG. 3 is a schematic view of an embodiment of a system for determining a torque exerted on a shaft of a wind turbine in accordance with embodiments of the present disclosure.

FIG. 3 illustrates a system 100 for determining a torque exerted on the rotor shaft 28 of the wind turbine 10. As shown, the system 100 includes a gearbox assembly 102 that may be incorporated into the wind turbine 10 in place of or in addition to the gearbox assembly 30. As will be discussed in greater detail below, the rotor 18 exerts torque on the rotor shaft 28 as the wind turbine 10 operates. A fluid pressure within various fluid dampers in the gearbox assembly 102 may be used to determine the torque exerted on the rotor shaft 28.

As shown in FIG. 3, the gearbox assembly 102 includes a gearbox 104. More specifically, the gearbox 104 includes a gearbox housing 106 that contains a gear set 108. The gear set 108 engages the rotor shaft 28 as an input and the generator shaft 34 as an output. In this respect, the gear set 108 may allow the rotor shaft 28 and the generator shaft 34 to rotate at different speeds. For example, the generator shaft 34 may operate at a higher rotational speed that the rotor shaft 28. The gear set 108 may be any suitable type of gear set (e.g., a planetary gear set) and/or include any suitable type of gears (e.g., spur gears, helical gears, etc.). The gearbox 104 also includes a first arm 110 and a second arm 112 extending outward from opposing sides of the gearbox housing 106. The first arm 110 includes a top surface 114 and a bottom surface 116. Similarly, the second arm 112 includes a top surface 118 and a bottom surface 120.

The gearbox assembly 102 also includes a gearbox mount 122 for coupling the gearbox 104 to the bedplate 32. In the embodiment shown in FIG. 3, the gearbox mount 122 includes a first gearbox mount portion 124 and a second gearbox mount portion 126. The first gearbox mount portion 124 may include a base wall 128 that couples to the bedplate 32, a side wall 130 coupled to the base wall 128, and a top wall 132 coupled to the side wall 130 and oriented parallel to the base wall 128. Similarly, the second gearbox mount portion 126 may include a base wall 134 that couples to the bedplate 32, a side wall 136 coupled to the base wall 134, and a top wall 138 coupled to the side wall 136 and oriented parallel to the base wall 134. The first and second gearbox mount portions 124, 126 may be separate components or a single component. In alternate embodiments, the gearbox mount 122 may have suitable structure for coupling the gearbox 104 to the bedplate 32.

As shown in FIG. 3, various fluid dampers may support the gearbox 104 relative to the gearbox mount 122. More specifically, a first fluid damper 140 may couple, such as directly connect, the first arm 110 (e.g., the top surface 114 of the first arm 110) to the top wall 132 of the first gearbox mount portion 124. A second fluid damper 142 may couple, such as directly connect, the second arm 112 (e.g., the bottom surface 120 of the second arm 112) to the base wall 134 of the second gearbox mount portion 126. A third fluid damper 144 may couple, such as directly connect, the first arm 110 (e.g., the bottom surface 116 of the first arm 110) to the base wall 128 of the first gearbox mount portion 124. A fourth fluid damper 146 may couple, such as directly connect, the second arm 112 (e.g., the top surface 118 of the second arm 112) to the top wall 138 of the second gearbox mount portion 126. In exemplary embodiments, each fluid damper 140, 142, 144, 146 may include a cylinder containing a fluid and a piston slidably positioned within the cylinder such that the fluid damps the movement of the piston. Alternate embodiments may include more or fewer fluid dampers.

In some embodiments, springs may couple the fluid dampers 140, 142, 144, 146 to the gearbox mount 122. For example, a first spring 148 may couple, such as directly connect, the first fluid damper 140 to the top surface 132 of the first gearbox mount portion 124. A second spring 150 may couple, such as directly connect, the second fluid damper 142 to the bottom surface 134 of the second gearbox mount portion 126. A third spring 152 may couple, such as directly connect, the third fluid damper 144 to the bottom surface 128 of the first gearbox mount portion 124. A fourth spring 154 may couple, such as directly connect, the fourth fluid damper 146 to the top surface 138 of the second gearbox mount portion 126. In alternate embodiments, the fluid dampers 140, 142, 144, 146 may couple directly to the gearbox mount 122.

In certain embodiments, additional springs may be positioned in parallel with the fluid dampers 140, 142, 144, 146 to further support the gearbox 104 relative to the gearbox mount 122. More specifically, a fifth spring 156 may couple the first arm 110 (e.g., the top surface 114 of the first arm 110) to the top wall 132 of the first gearbox mount portion 124. A sixth spring 158 may couple the second arm 112 (e.g., the bottom surface 120 of the second arm 112) to the base wall 134 of the second gearbox mount portion 126. A seventh spring 160 may couple the first arm 110 (e.g., the bottom surface 116 of the first arm 110) to the base wall 128 of the first gearbox mount portion 124. An eighth spring 162 may couple the second arm 112 (e.g., the top surface 118 of the second arm 112) to the top wall 138 of the second gearbox mount portion 126. The springs 156, 158, 160, 162 may be positioned between the side walls 130, 136 and the fluid dampers 140, 142, 144, 146 or between the fluid dampers 140, 142, 144, 146 and the gearbox housing 106. Although, alternate embodiments may more or fewer springs (including zero springs).

The fluid dampers 140, 142, 144, 146 may be fluidly connected, such as directly connected, by various fluid conduits that permit fluid flow therebetween. More specifically, the fluid conduits fluidly couple fluid dampers 140, 142, 144, 146 located on opposite sides of the gearbox 104. In this respect, and as shown in FIG. 3, a first fluid conduit 164 may fluidly couple the first and second fluid dampers 140, 142. As such, fluid may flow between the first and second fluid dampers 140, 142. Similarly, a second fluid conduit 166 may fluidly couple third and fourth fluid dampers 144, 146. Accordingly, fluid may flow between the third and fourth fluid dampers 144, 146. In certain embodiments, the first fluid conduit 164 is fluidly isolated from the second fluid conduit 166. That is, the fluid may not be able to flow between the first and second fluid conduits 164, 166. In exemplary embodiments, the fluid may be a water and glycol mixture. In alternate embodiments, the fluid may be any suitable fluid.

As mentioned above, the rotor 18 exerts a torque on the rotor shaft 28 during operation of the wind turbine 10. This torque causes the rotor shaft 28 to rotate, thereby driving the gearbox 104, the generator shaft 32 (if included), and the generator 24. The rotation of the rotor shaft 28, in turn, exerts torque on the gearbox 104. In this respect, at least some of the various fluid dampers 140, 142, 144, 146 resist the torque exerted on the gearbox 104, thereby preventing the gearbox 104 from rotating relative to the gearbox mount 122. Some or all of the springs 148, 150, 152, 154, 156, 158, 160, 162, if included, may further resist torque exerted the gearbox 104.

In the embodiment shown in FIG. 3, the first and second fluid dampers 140, 142 may at least partially resist the torque exerted on the gearbox 104. More specifically, the rotor shaft 28 may rotate in a rotation direction indicated by an arrow 167, thereby exerting a torque on the gearbox 104 acting in the same direction. The fluid pressure in the first and second dampers 140, 142 and the first fluid conduit 164 increases to counteract the torque exerted on the gearbox 104 by the rotor shaft 28. For example, fluid chambers of the first and second fluid dampers 140, 142 may shrink in such instances, thereby increasing the fluid pressure therein. In this respect, the fluid pressure in the first fluid conduit 164 is related to or otherwise associated with the torque exerted on the rotor shaft 28. In particular, fluid pressure in the first fluid conduit 164 increases as the torque exerted on the rotor shaft 28 increases. Conversely, the fluid pressure in the third and fourth conduits 144, 146 and the second fluid conduit 166 decreases when torque is exerted on the gearbox 104. For example, fluid chambers of the third and fourth fluid dampers 144, 146 may expand, thereby decreasing the fluid pressure therein.

In alternate embodiments, the rotor shaft 28 may rotate in a rotation direction opposite to the arrow 167. In such embodiments, the third and fourth fluid dampers 144, 146 and the second fluid conduit 166 may experience an increase in fluid pressure to counteract the torque exerted on the rotor shaft 28. Conversely, the first and second fluid dampers 140, 142 and the first fluid conduit 164 may experience a decrease in fluid pressure.

The system 100 may also include a pressure sensor in operative association with one of the fluid conduits 164, 166. In certain embodiments, the pressure sensor is in operative association with the fluid conduit 164, 166 experiencing the increase in fluid pressure when torque is exerted on the rotor shaft 28. In the embodiment shown in FIG. 3, for example, the system 100 includes a first pressure sensor 168 in operative association with the first fluid conduit 164. In this respect, the first pressure sensor 168 detects a fluid pressure of fluid within the first fluid conduit 164. As such, the first pressure sensor 168 is in fluid communication with the first fluid conduit 164. As discussed in greater detail above, the fluid pressure of fluid in the first fluid conduit 164 may correspond to or otherwise be associated with the torque exerted on the rotor shaft 28. The first pressure sensor 168 may be a pressure transducer or any other suitable type of pressure sensor. In alternate embodiments, however, the first pressure sensor 168 may be in operative association with the second fluid conduit 166.

Referring still to FIG. 3, the system 100 may include a controller 170 communicatively coupled to one or more components of the system 100, such as the first pressure sensor 168. In certain embodiments, the controller 170 may correspond to the turbine controller 26 of the wind turbine 10. Alternately, the controller 170 may be a separate processing device of the wind turbine 10 in addition to the turbine controller 26.

In general, the controller 170 may comprise any suitable processor-based device known in the art, such as a computing device or any suitable combination of computing devices. In this respect, the controller 170 may include one or more processor(s) 172 and associated memory device(s) 174 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 174 of the controller 170 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 174 may generally be configured to store suitable computer-readable instructions that, when implemented by the processor(s) 172, configure the controller 170 to perform various computer-implemented functions, such as one or more aspects of the method 200 described below with reference to FIG. 5. In addition, the controller 170 may also include various other suitable components, such as a communications circuit or module, one or more input/output channels, a data/control bus and/or the like.

As indicated above, the controller 170 is communicatively coupled to the first pressure sensor 168. In particular, the controller 170 may be communicatively coupled to the first pressure sensor 168 via a wired or wireless connection. In this respect, measurement signals (e.g., indicated by dashed line 176 in FIG. 3) may be transmitted from the first pressure sensor 168 to the controller 170. The controller 170 may then be configured to determine the torque on the rotor shaft 28 based on the measurement signals 176 received from the first pressure sensor 168. For example, the controller 170 may include a look-up table or suitable mathematical formula stored within its memory 174 that correlates the fluid pressure measurements to the torque exerted on the rotor shaft 28.

Figure 4:
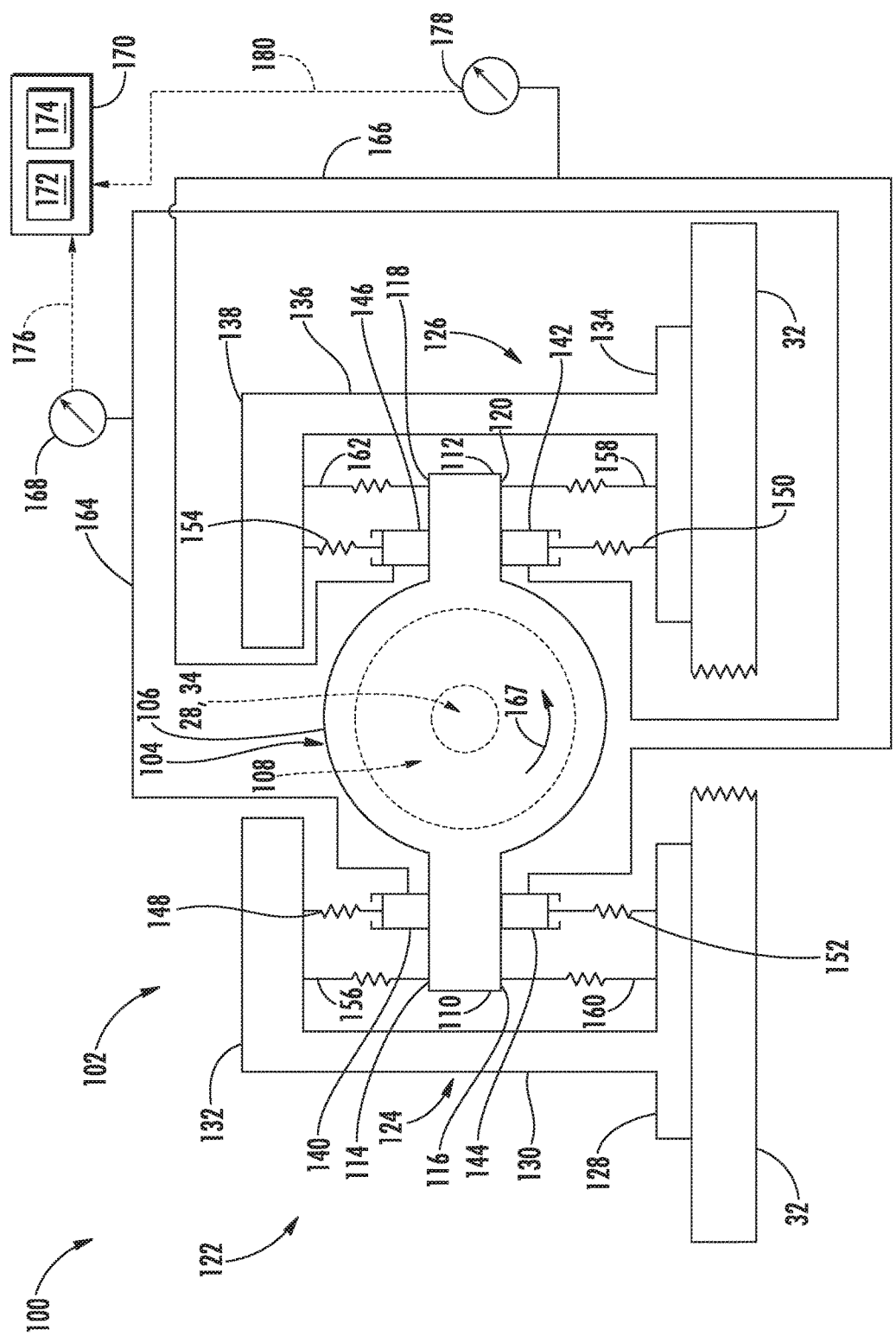
FIG. 4 is a schematic view of an alternate embodiment of a system for determining a torque exerted on a shaft of a wind turbine in accordance with embodiments of the present disclosure.

FIG. 4 illustrates an alternative embodiment of the system 100. As shown, the system 100 may also include a pressure sensor in operative association with each of the fluid conduits 164, 166. In the embodiment shown in FIG. 4, for example, the system 100 includes the first pressure sensor 168 in operative association with the first fluid conduit 164 as discussed in greater detail above. The system 100 also includes a second pressure sensor 178 in operative association with the second fluid conduit 166. In this respect, the second pressure sensor 178 detects a fluid pressure of fluid within the second fluid conduit 164. As such, the second pressure sensor 178 is in fluid communication with the second fluid conduit 166. As discussed in greater detail above, the fluid pressure of fluid in the first fluid conduit 164 and/or the second fluid conduit 166 may correspond to or otherwise be associated with the torque exerted on the rotor shaft 28. The second pressure sensor 178 may be a pressure transducer or any other suitable type of pressure sensor.

The controller 170 may be communicatively coupled to the second pressure sensor 178. In particular, the controller 170 may be communicatively coupled to the second pressure sensor 178 via a wired or wireless connection. In this respect, measurement signals (e.g., indicated by dashed line 180 in FIG. 4) may be transmitted from the second pressure sensor 178 to the controller 170. The controller 170 may then be configured to determine the torque on the rotor shaft 28 based on the measurement signals 176 received from the first pressure sensor 168 and/or the measurement signals 180 received from the second pressure sensor 178 (e.g., via suitable mathematical functions or a look-up table). In certain embodiments, for example, both measurement signals 176, 180 may be used together to determine the torque on the rotor shaft 28. In alternate embodiments, a first measurement signal (e.g., the measurement signals 176) may be used to determine the torque on the rotor shaft 28 during normal operation of the wind turbine 10. In this respect, a second measurement signal (e.g., the measurement signal 180) may be used only when, e.g., the first measurement signal is outside of a predetermined range or the controller 170 fails to receive the first measurement signal.

Figure 5:
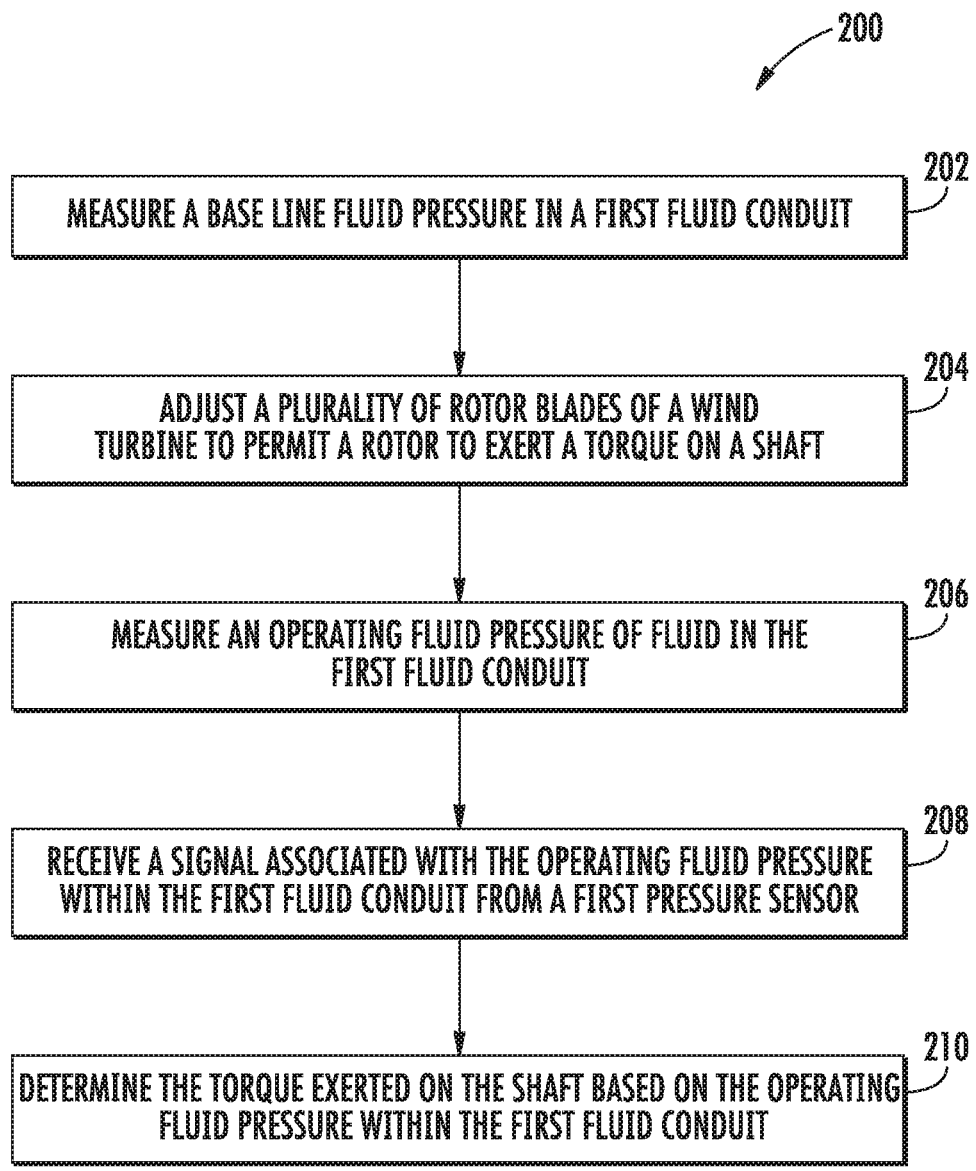
FIG. 5 is a flow chart illustrating a method for determining a torque exerted on a shaft of a wind turbine in accordance with embodiments of the present disclosure.

FIG. 5 illustrates a method 200 for determining a torque exerted on a shaft of a wind turbine in accordance with embodiments of the present disclosure. The method 200 will be described below in the context of determining the torque exerted on the rotor shaft 28 of the wind turbine 10. Nevertheless, the method 200 may be used to determine torque on any shaft of any wind turbine.

In step 202, the first pressure sensor 168 may measure a base line fluid pressure in the first fluid conduit 164. In particular, the base line fluid pressure may be the fluid pressure in the first fluid conduit 164 when no torque is exerted on the rotor shaft 28 (e.g., when the wind turbine 10 is not in operation). That is, the baseline fluid pressure is measured when the first and second fluid dampers 140, 142 are not resisting torque exerted on the gearbox 104. The controller 170 may then receive the measurement signals 176 from the first pressure sensor 168 indicative of the base line fluid pressure. As will be discussed below, the controller 170 may use the base line fluid pressure when determining the torque exerted on the rotor shaft 28. In some embodiments, the second pressure sensor 178 may measure a base line fluid pressure in the second fluid conduit 166. In alternate embodiments, the step 202 may not be performed.

In step 204, one or more actuators may adjust the rotor blades 22 of the wind turbine 10 to permit the rotor 18 to exert torque on the rotor shaft 28. For example, the actuator 52 of each pitch adjustment mechanism 50 may rotate the corresponding rotor blade 22 about its pitch axis 54 to position the rotor blade 22 in an orientation that allows the rotor 18 to exert torque on the rotor shaft 28. Furthermore, a tip speed ratio of the rotor blades 22 may be adjusted by adjusting the torque of the generator 23 to extract maximum power. The actuator 44 of the yaw drive mechanism 40 may rotate the nacelle 16 about the yaw axis 46 to position the nacelle 16 in an orientation that allows the rotor 18 to exert torque on the rotor shaft 28. In alternate embodiments, step 204 may not be performed.

In step 206, the first pressure sensor 168 measures an operating fluid pressure of fluid in the first fluid conduit 164. In particular, step 206 is performed when torque is exerted on the rotor shaft 28 (e.g., when the wind turbine 10 is operating). That is, the operating fluid pressure is measured when the first and second fluid dampers 140, 142 are resisting torque exerted on the gearbox 104. In some embodiments, the second pressure sensor 178 may measure an operating fluid pressure of fluid in the second fluid conduit 166. In such embodiments, the operating fluid pressure in the first fluid conduit 164 may be independent of the operating fluid pressure in the second fluid conduit 166.

In step 208, the controller 170 receives a signal associated with the operating fluid pressure within the first fluid conduit 164 (e.g., the measurement signals 176). In some embodiments, the controller 170 may also receive a signal associated with the operating fluid pressure within the second fluid conduit 166 (e.g., the measurement signals 180).

In step 210, the controller 170 may determine the torque exerted on the rotor shaft 28 based on the operating fluid pressure within the first fluid conduit 164. As discussed above, the fluid pressure in the first fluid conduit 164 may correspond to or otherwise be associated with the torque exerted on the rotor shaft 28. In this respect, the controller 170 may determine the torque exerted on the rotor shaft 28 using a suitable look-up table or mathematical function. In certain embodiments, the controller 170 may use the base line fluid pressure in the first fluid conduit 164 when determining the torque exerted on the rotor shaft 28. In some embodiments, the controller 170 may determine the torque exerted on the rotor shaft 28 based on the operating fluid pressure within the second fluid conduit 166 in lieu of or in addition to using the operating fluid pressure within the first fluid conduit 164.

As discussed above, the system 100 and method 200 disclosed herein determine the torque exerted on the rotor shaft 28 based on the fluid pressure in the first fluid conduit 164 coupling the first and second fluid dampers 140, 142. More specifically, the torque exerted on the rotor shaft 28 is transferred to the gearbox 104. The first and second fluid dampers 140, 142 resist this torque to prevent the gearbox 104 from rotating. As such, the fluid pressure in in the first fluid conduit 164 corresponds to the torque exerted on the rotor shaft 28. In this respect, determining the torque exerted on the rotor shaft 28 using fluid pressure in the first fluid conduit 164 results in more accurate results due to unaccounted power losses in the gearbox 104 and the electrical system. In this respect, the system 100 and the method 200 provide more reliable determinations of the torque exerted on the rotor shaft 28 than conventional systems and methods.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for determining a torque exerted on a shaft of a wind turbine, the system comprising:
   a gearbox coupled to the shaft, the gearbox including a first arm and a second arm;
   first and second fluid dampers respectively coupled to the first and second arms of the gearbox;
   a first fluid conduit fluidly coupling the first and second fluid dampers;
   a first pressure sensor in operative association with the first fluid conduit to detect a fluid pressure of fluid within the first fluid conduit; and
   a controller communicatively coupled to the first pressure sensor, the controller being configured to determine the torque exerted on the shaft based on measurement signals received from the first pressure sensor.

2. The system of claim 1, wherein the first fluid damper couples to a top surface of the first arm and the second fluid damper couples to a bottom surface of the second arm.

3. The system of claim 1, further comprising:
   third and fourth fluid dampers respectively coupled to the first and second arms of the gearbox;
   a second fluid conduit fluidly coupling the third and fourth fluid dampers.

4. The system of claim 3, further comprising:
   a second pressure sensor in operative association with the second fluid conduit to detect a fluid pressure within the second fluid conduit, wherein the controller is communicatively coupled to the second pressure sensor and configured to determine the torque exerted on the shaft based on measurement signals received from the second sensor.

5. The system of claim 3, wherein the second fluid conduit is fluidly isolated from the first fluid conduit.

6. The system of claim 3, wherein the first fluid damper couples to a top surface of the first arm, the second fluid damper couples to a bottom surface of the second arm, the third fluid damper couples to a bottom surface of the first arm, and the fourth fluid damper couples to a top surface of the second arm.

7. The system of claim 1, further comprising:
   a gearbox mount coupled to a bed plate of the wind turbine, wherein the first and second fluid dampers support the gearbox relative to the gearbox mount.

8. The system of claim 1, wherein the shaft couples a rotor to the gearbox.

9. The system of claim 1, wherein the first pressure sensor is a pressure transducer.

10. A wind turbine, comprising:
    a tower;
    a nacelle mounted on the tower;
    a rotor coupled to the nacelle, the rotor comprising a hub and at least one rotor blade extending from the hub;
    a gearbox positioned within the nacelle, the gearbox including first and second arms;
    a gearbox mount coupling the gearbox to the nacelle;
    a shaft rotatably coupling the rotor and the gearbox;
    first and second fluid dampers respectively coupling the first and second arms of the gearbox to a gearbox mount;
    a first fluid conduit fluidly coupling the first and second fluid dampers;
    a first pressure sensor in operative association with the first fluid conduit to detect a fluid pressure of a fluid within the first fluid conduit; and
    a controller communicatively coupled to the first pressure sensor, the controller being configured to determine the torque exerted on the shaft based on measurement signals received from the first pressure sensor.

11. The wind turbine of claim 10, wherein the first fluid damper couples to a top surface of the first arm and the second fluid damper couples to a bottom surface of the second arm.

12. The wind turbine of claim 10, further comprising:
third and fourth fluid dampers respectively coupled to the first and second arms of the gearbox;
a second fluid conduit fluidly coupling the third and fourth fluid dampers.

13. The wind turbine of claim 12, further comprising:
a second pressure sensor in operative association with the second fluid conduit to detect a fluid pressure of fluid within the second fluid conduit, wherein the controller is communicatively coupled to the second pressure sensor and configured to determine the torque exerted on the shaft based on measurement signals received from the second pressure sensor.

14. The wind turbine of claim 12, wherein the second fluid conduit is fluidly isolated from the first fluid conduit.

15. The wind turbine of claim 12, wherein the first fluid damper couples to a top surface of the first arm, the second fluid damper couples to a bottom surface of the second arm, the third fluid damper couples to a bottom surface of the first arm, and the fourth fluid damper couples to a top surface of the second arm.

16. A method for determining a torque exerted on a shaft of a wind turbine, the method comprising:
measuring, with a first pressure sensor, an operating fluid pressure of fluid in a first fluid conduit fluidly coupling first and second fluid dampers that support a gearbox relative to a gearbox mount;
receiving, with a controller, a measurement signal from the first pressure sensor, the measurement signal being associated with the operating fluid pressure within the first fluid conduit; and
determining, with the controller, the torque exerted on the shaft based on the operating fluid pressure within the first fluid conduit.

17. The method of claim 16, further comprising:
measuring, with a second pressure sensor, an operating fluid pressure of a fluid in a second fluid conduit fluidly coupling third and fourth fluid dampers that support a gearbox relative to a gearbox mount;
receiving, with the controller, a measurement signal from the second pressure sensor, the measurement signal being associated with the operating fluid pressure within the second fluid conduit; and
determining, with the controller, the torque exerted on the shaft based on the operating fluid pressure within the second fluid conduit.

18. The method of claim 17, wherein the operating fluid pressure in the first fluid conduit is independent of the operating fluid pressure in the second fluid conduit.

19. The method of claim 16, further comprising:
adjusting, with an actuator, a plurality of rotor blades of the wind turbine to permit the rotor to exert torque on the shaft.

20. The method of claim 19, further comprising:
measuring, with the first pressure sensor, a base line fluid pressure in the first fluid conduit prior to adjusting the plurality of rotor blades.

* * * * *